United States Patent
Cheng et al.

(10) Patent No.: US 10,833,762 B2
(45) Date of Patent: Nov. 10, 2020

(54) INFORMATION TRANSMISSION METHOD, INFORMATION RECEPTION METHOD AND APPARATUS

(71) Applicant: TENCENT TECHNOLOGY (SHENZHEN) COMPANY LIMITED, Shenzhen (CN)

(72) Inventors: Shihai Cheng, Shenzhen (CN); Jinhai Liu, Shenzhen (CN); Anqi Ren, Shenzhen (CN); Yaobo Hua, Shenzhen (CN); Liangliang Fan, Shenzhen (CN); Kai Liu, Shenzhen (CN); Xiangyao Lin, Shenzhen (CN); Chenglin Liu, Shenzhen (CN); Bin Huang, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 499 days.

(21) Appl. No.: 15/217,392

(22) Filed: Jul. 22, 2016

(65) Prior Publication Data

US 2016/0352420 A1 Dec. 1, 2016

Related U.S. Application Data (63) Continuation of application No. PCT/CN2015/089024, filed on Sep. 7, 2015.

(30) Foreign Application Priority Data

Jul. 10, 2014 (CN) .......................... 2014 1 0327527

(51) Int. Cl.
*H04L 9/32* (2006.01)
*H04B 10/11* (2013.01)
(Continued)

(52) U.S. Cl.
CPC .......... *H04B 10/11* (2013.01); *H04B 10/114* (2013.01); *H04L 9/0625* (2013.01);
(Continued)

(58) Field of Classification Search
CPC combination set(s) only.
See application file for complete search history.

(56) References Cited

U.S. PATENT DOCUMENTS

| 7,021,534 B1 * | 4/2006 | Kiliccote | .............. G06F 21/606 |
| | | | 235/380 |
| 7,379,921 B1 * | 5/2008 | Kiliccote | ............. G06Q 20/401 |
| | | | 705/75 |

(Continued)

FOREIGN PATENT DOCUMENTS

| CN | 101141199 A | 3/2008 |
| CN | 102202245 A | 9/2011 |

(Continued)

OTHER PUBLICATIONS

"Horng Jeng, Chih-Jen Lee, Yong-Rui Wang, Chien-Kang Cheng, Secure Information retrieval and reveal for mobile apparatus based on 2D barcode digital signature, Ma625-28,2009, IEEE Xplore, INSPEC#10749661"; (Year: 2009).*

(Continued)

*Primary Examiner* — Phy Anh T Vu
(74) *Attorney, Agent, or Firm* — Brinks Gilson & Lione (57) ABSTRACT

An information transmitting method and device, and an information receiving method and device are provided. The information transmitting method includes: obtaining authentication information; converting the authentication information into a binary sequence; encoding the binary sequence into optical signals based on a correspondence between a binary number and an optical signal; and transmitting the optical signals to a receiving device, wherein the receiving
(Continued)

device receives the optical signals, obtains the authentication information carried in the optical signals, and performs an information authentication based on the authentication information.

16 Claims, 5 Drawing Sheets (51) Int. Cl.
  H04B 10/114 (2013.01)
  H04L 29/06 (2006.01)
  H04L 9/06 (2006.01)
(52) U.S. Cl.
  CPC ........ *H04L 9/3247* (2013.01); *H04L 63/0428* (2013.01); *H04L 63/08* (2013.01); *H04L 63/18* (2013.01)

(56) References Cited

U.S. PATENT DOCUMENTS

| | | | | |
|---|---|---|---|---|
| 7,380,708 B1* | 6/2008 | Kiliccote | ............ | G06F 21/6209 235/380 |
| 7,543,748 B2* | 6/2009 | Kiliccote | ................ | G06K 7/14 235/435 |
| 7,578,436 B1* | 8/2009 | Kiliccote | .............. | G06F 21/606 235/375 |
| 7,634,802 B2* | 12/2009 | Chiloyan | .............. | H04W 12/06 713/155 |
| 7,778,924 B1* | 8/2010 | Ananda | .............. | G07B 17/0008 705/50 |
| 8,302,202 B2* | 10/2012 | Dawson | .............. | H04L 63/0853 705/50 |
| 8,540,149 B1* | 9/2013 | Chu | .................... | G07G 1/0045 235/375 |
| 8,556,164 B1* | 10/2013 | Freedman | .......... | G06Q 30/0207 235/375 |
| 2002/0145043 A1* | 10/2002 | Challa | ..................... | G06K 7/10 235/462.01 |
| 2002/0167601 A1* | 11/2002 | Ohzu | ..................... | H04N 5/378 348/243 |
| 2004/0220298 A1* | 11/2004 | Kozee | ..................... | B41M 3/144 523/160 |
| 2005/0139680 A1* | 6/2005 | Anttila | ................ | H04M 1/7253 235/462.46 |
| 2006/0157559 A1* | 7/2006 | Levy | ..................... | G06K 17/00 235/380 |
| 2008/0127331 A1* | 5/2008 | Seidman | ................ | G06Q 10/10 726/21 |
| 2009/0250514 A1* | 10/2009 | Wilds | .................... | G06K 19/10 235/380 |
| 2010/0012736 A1* | 1/2010 | Wilds | ....................... | G06K 7/14 235/494 |
| 2010/0246902 A1* | 9/2010 | Rowe | ................... | G06K 9/2018 382/115 |
| 2012/0217296 A1* | 8/2012 | Merel | ..................... | G06Q 30/02 235/380 |
| 2012/0326643 A1* | 12/2012 | Brannen | .................. | H02P 6/16 318/400.11 |
| 2013/0015236 A1* | 1/2013 | Porter | ................... | G06F 21/645 235/375 |
| 2013/0173484 A1* | 7/2013 | Wesby | .................. | G06Q 30/06 705/318 |
| 2014/0097246 A1* | 4/2014 | Hu | ....................... | G06K 7/1417 235/437 |
| 2014/0105449 A1* | 4/2014 | Caton | ..................... | G06F 21/34 382/100 |
| 2014/0223175 A1* | 8/2014 | Bhatnagar | ................ | G09C 5/00 713/159 |
| 2014/0321864 A1* | 10/2014 | Bliss | .................... | H04B 10/588 398/186 |
| 2016/0078333 A1* | 3/2016 | Simske | ............ | G06K 19/06056 235/462.04 |

FOREIGN PATENT DOCUMENTS

| | | |
|---|---|---|
| CN | 102394700 A | 3/2012 |
| CN | 102983976 A | 3/2013 |
| CN | 103117984 A | 5/2013 |
| CN | 103812574 A | 5/2014 |
| CN | 104243026 A | 12/2014 |
| JP | 63248239 A | 10/1998 |
| WO | WO2016/004905 A1 | 1/2016 |

OTHER PUBLICATIONS

"Giuseppe Schirripa Spagnolo, Lorenzo Cozzella, Michele De Santis, New 2D barcode solution based on computer generated holograms: Holographic barcode, May 2-4, 2102, IEEE Xplore, INSPEC#12820443" (Year: 2012).*

Office Action dated Oct. 30, 2015 for Chinese Application No. 201410327527.5, 10 pages.

International Search Report for PCT/CN2015/089024 dated Oct. 28, 2015 (English Translation included).

* cited by examiner

INFORMATION TRANSMISSION METHOD, INFORMATION RECEPTION METHOD AND APPARATUS

CROSS REFERENCE TO RELATED APPLICATION

The present application a continuation of International Application No. PCT/CN2015/089024, filed on Sep. 7, 2015, whose priority has been restored by the PCT/RO/CN, which claims priority to Chinese Patent Application No. 201410327527.5, titled "INFORMATION TRANSMISSION METHOD, INFORMATION RECEPTION METHOD, APPARATUS AND SYSTEM" and filed on Jul. 10, 2014 with the State Intellectual Property Office of People's Republic of China, both of which are hereby incorporated by reference in their entireties.

TECHNICAL FIELD

The present disclosure relates to the field of computer technology, and in particular to an information transmission method and device, and an information reception method and device.

BACKGROUND

When a user uses an electronic device, the electronic device often needs to transmit authentication information to another electronic device to achieve an information authentication.

At present, a common information transmission method includes following steps. A transmitting device obtains authentication information and establishes a network connection with a receiving device. The transmitting device transmits the obtained authentication information to the receiving device via the established network connection. The receiving device receives the authentication information and then authenticates the authentication information upon receipt of the authentication information.

In a process of implementing the above method, the inventors find that there are at least the following problems in the above-mentioned technology. When the transmitting device cannot establish the network connection to the receiving device, the transmitting device cannot transmit the authentication information to the receiving device and the information authentication cannot be implemented. In addition, when the transmitting device transmits the authentication information via the network connection, the authentication information transmitted by the transmitting device is easily stolen by a hacker. Therefore, the authentication information transmitted based on the above information transmission method may be leaked.

SUMMARY

In order to solve problems in the existing technology, an information transmission method and device, an information reception method and device are provided according to embodiments of the disclosure.

In the first aspect, an information transmission method is provided, which includes:
obtaining authentication information;
converting the authentication information into a binary sequence;
encoding the binary sequence into corresponding optical signals based on a correspondence between a binary number and an optical signal; and
transmitting the optical signals to a receiving device, where the receiving device receives the optical signals, obtains the authentication information in the optical signals, and performs an information authentication based on the authentication information.

In the second aspect, an information reception method is provided, which includes:
receiving optical signals from a transmitting device, where the optical signals carry authentication information of the transmitting device;
decoding the optical signals into a corresponding binary sequence based on a correspondence between a binary number and an optical signal;
converting the binary sequence into the authentication information; and
performing an information authentication based on the authentication information.

In the third aspect, an information transmitting device is provided, which includes one or more processors configured to execute program instructions stored in a non-volatile storage medium to cause the information transmitting device to perform the following operations:
obtaining authentication information;
converting the obtained authentication information into a binary sequence;
encoding the binary sequence into corresponding optical signals based on a correspondence between a binary number and an optical signal; and
transmitting the encoded optical signals to a receiving device, where the receiving device receives the optical signals, obtains the authentication information in the optical signals, and performs an information authentication based on the authentication information.

In the fourth aspect, an information receiving device is provided, which includes one or more processors configured to execute program instructions stored in a storage medium to cause the information receiving device to perform the following operations:
receiving optical signals from a transmitting device, where the optical signal carries authentication information of the transmitting device;
decoding the optical signals into a corresponding binary sequence based on a correspondence between a binary number and an optical signal;
converting the binary sequence into the authentication information; and
performing an information authentication based on the authentication information.

BRIEF DESCRIPTION OF THE DRAWINGS

To illustrate technical solutions according to embodiments of the present disclosure more clearly, drawings to be used in the descriptions of the embodiments are described briefly hereinafter. The drawings described hereinafter are only for some embodiments of the present disclosure, and other drawings may be obtained by those skilled in the art based on those drawings without creative efforts.

DETAILED DESCRIPTION

In order to make an objective, technical solutions and advantages of the invention more clear, embodiments are described hereinafter in conjunction with drawings. The described embodiments are only a few rather than all of embodiments of the present invention. All the other embodiments obtained by those skilled in the art without creative effort on the basis of the embodiments in the present disclosure fall within the scope of protection of the claims.

Figure 1:
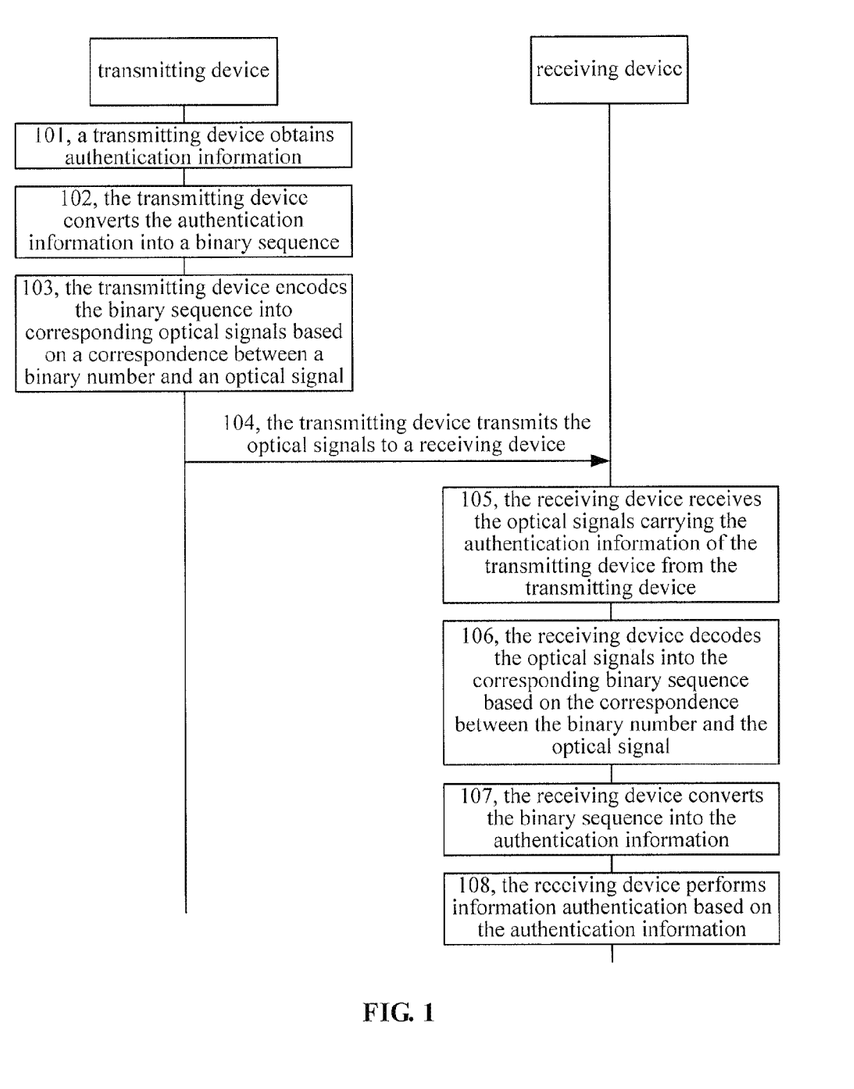
FIG. 1 is a flow chart of an information transmission method according to an embodiment of the disclosure.

An embodiment is shown in FIG. 1, which is a flow chart of an information transmission method of. The information transmission method may include steps 101 to 108.

In step 101, a transmitting device obtains authentication information.

In step 102, the transmitting device converts the authentication information into a binary sequence.

In step 103, the transmitting device encodes the binary sequence into corresponding optical signals based on a correspondence between a binary number and an optical signal.

In step 104, the transmitting device transmits the encoded optical signals to a receiving device.

In step 105, the receiving device receives the optical signals from the transmitting device, which the optical signals carry the authentication information of the transmitting device.

In step 106, the receiving device decodes the optical signals into a corresponding binary sequence based on the correspondence between the binary number and the optical signal.

In step 107, the receiving device converts the binary sequence into the authentication information.

In step 108, the receiving device performs an information authentication based on the authentication information.

With the information transmission method according to the embodiment, the transmitting device converts the obtained authentication information into the binary sequence, generates the optical signals corresponding to the binary sequence based on the correspondence between the binary sequence and the optical signal, and transmits the generated optical signals to the receiving device. Upon receiving the optical signals, the receiving device obtains the authentication information in the optical signals, and performs the information authentication based on the authentication information. The technical solutions solve a problem that the transmitting device cannot transmit the authentication information to the receiving device and the information authentication cannot be implemented in the existing technology, because the transmitting device cannot establish a network connection to the receiving device. In addition, the authentication information carried in the optical signal is transmitted. In this way, the technical solutions also solve a problem that the authentication information transmitted by the transmitting device is easily stolen by a hacker and then may be leaked in the existing technology. Thus, the following effects are achieved, in that the transmitting device can always transmit the optical signals which carry the authentication information to the receiving device and the authentication information in the optical signal is not easily leaked.

In the above embodiment, procedures implemented by a transmitting device can be individually implemented as an information transmission method on the transmitting device; and procedures implemented by a receiving device can be individually implemented as an information reception method on the receiving device.

Figure 2A:
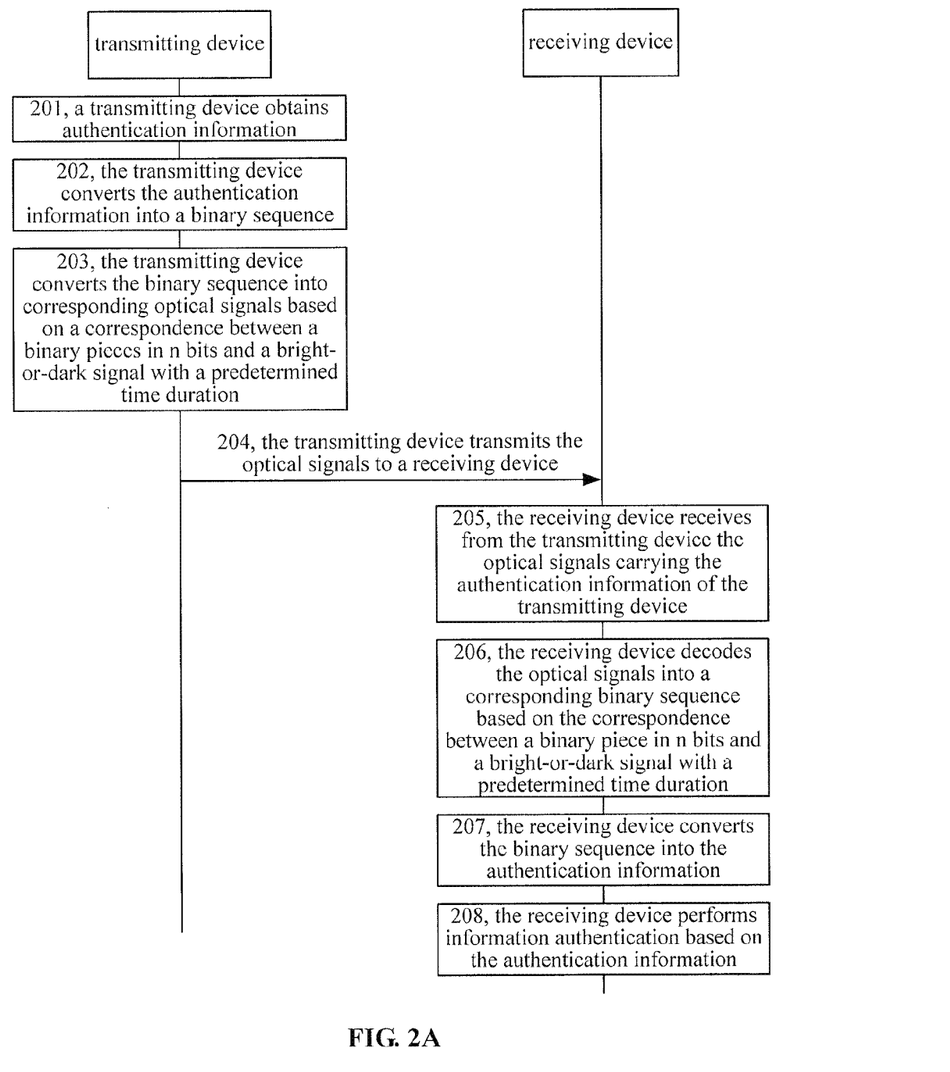
FIG. 2A is a flow chart of an information transmission method according to another embodiment of the disclosure.

In another embodiment FIG. 2A, is a flow chart of an information transmission method. The information transmission method may include steps 201 to 208.

In step 201, a transmitting device obtains authentication information.

The authentication information may include identification of the transmitting device, or identification of a client run in the transmitting device, or both identification of the transmitting device and identification of a client run in the transmitting device. Certainly, in actual implementation, the authentication information may also include other contents on the basis of various scenarios, which will not be limited by the embodiment.

In step 202, the transmitting device converts the authentication information into a binary sequence.

In step 203, the transmitting device encodes the binary sequence into corresponding optical signals based on a correspondence between a binary of n bits and a bright-or-dark signal with a predetermined time duration, After converting the authentication information to obtain the corresponding binary sequence, the transmitting device may encode the binary sequence into the corresponding optical signals based on the correspondence between a binary segment of n bits of the binary sequence and a bright-or-dark signal with a predetermined time duration, where n is a power of two. A minimum time duration of a bright signal generated by the transmitting device may be much less than a minimum time duration of a dark signal generated by the transmitting device, different binary segments in n bits are encoded by using the bright signals with different time durations. In this way, when transmitting binary sequences with the same length, a time duration for transmitting the binary sequence by using the optical signals, which are encoded in the encoding mode according to the embodiment, is shorter, thereby improving the information transmitting efficiency.

In an implementation, the step 203 may include steps 2031 to 2035.

In step 2031, the transmitting device splits the binary sequence into binary segments of n bits.

For example, a binary sequence converted by the transmitting device is "1011 0101 0111 0010 1010". When n is 2, the transmitting device splits the above binary sequence into binary segments comprising 2 bits, and the segmented binary sequence may include "10", "11", "01", "01", "01", "11", "00", "10", "10", and "10". When n is 4, the transmitting devices segments the above binary sequence into binary segments of 4 bits, and the segmented binary sequence may include "1011", "0101", "0111", "0010", and "1010". When n is 8 or 16, the transmitting device may also perform a similar segmentation, which is not described herein by the embodiment.

In step 2032, for the i-th binary segment, when i=1, a bright signal corresponding to the first binary segment is determined based on a first correspondence.

The first correspondence includes a correspondence between a binary segment of n bits and a bright signal with a predetermined time duration, where i is a positive integer.

In step 2033, when i is larger than 1 and the (i−1)-th binary segment corresponds to a bright signal, a dark signal corresponding to the i-th binary segment is determined based on a second correspondence.

The second correspondence includes a correspondence between a binary segment of n bits and a dark signal with a predetermined time duration.

In step 2034, when i is larger than 1 and the (i−1)-th binary segment corresponds to a dark signal, a bright signal corresponding to the i-th binary segment is determined based on the first correspondence.

Taking an example that n is 4, in the first correspondence, the bright signals with time durations L, L+1, L+2, L+15 are used to successively represent 16 binary segments. In the second correspondence, the dark signal with time durations M, M+1, M+2, . . . , M+15, are used to successively represent 16 binary segments. One possible corresponding method including the first correspondence and the second correspondence is shown as FIG. 2B. In segments "1011", "0101", "0111", "0010" and "1010" segmented by the transmitting device, for the first binary segment "1011", the transmitting device may determine an optical signal corresponding to "1011" as a bright signal with "L+11 ms" based on the first correspondence; for the second binary segment "0101", the transmitting device may determine an optical signal corresponding to "0101" as a dark signal with "M+13 ms" based on the second correspondence; for the third binary segment "0111", the transmitting device may determine an optical signal corresponding to "0111" as a bright signal with "L+7 ms" based on the first correspondence; for the fourth binary segment "0010", the transmitting device may determine an optical signal corresponding to "0010" as a dark signal with "M+10 ms" based on the second correspondence; and for the fifth binary segment "1010", the transmitting device may determine an optical signal corresponding to "1010" as a bright signal with "L+10 ms" based on the first correspondence.

Figure 2B:
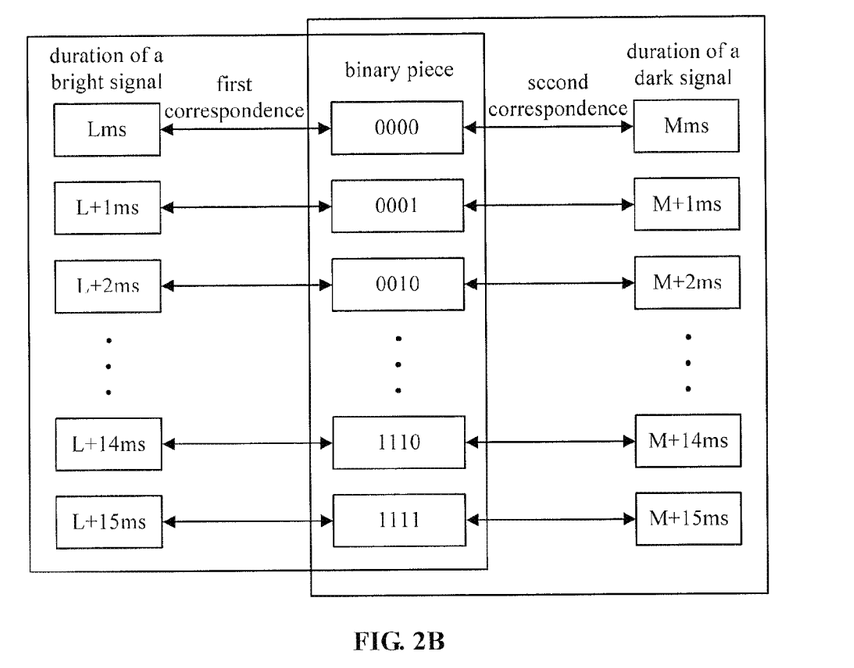
FIG. 2B is a schematic diagram of a first correspondence and a second correspondence according to another embodiment of the disclosure.

It may be understood based on FIG. 2B that the time taken by transmitting a binary piece is (L+(L+1)+ . . . +(L+15)+M+(M+1)+ . . . +(M+15))/32=(L+M+15)/2; the time taken by transmitting one bit of binary number is (L+M+15)/8; and an information transmission rate is 1/((L+M+15)/8).

In another optical signal encoding method, a corresponding relationship adopted by the transmitting device may be that the bright signal with a time duration "j" ms represents a binary number "1" and the dark signal with a time duration "k" ms represents a binary number "0". When information is transmitted by an optical signal in the above encoding method, the time taken by transmitting one bit of the binary number (assuming that a probability of appearing 0 is the same as a probability of appearing 1 in a binary sequence) is (j+k)/2, and an information transmission rate is 1/((j+k)/2).

Thus, when L=j and M=k, the transmitting device can only generate a bright signal whose shortest time is "1" ms and a dark signal whose shortest time is "10" ms, namely, a minimum of j is 1 and a minimum of k is 10. Therefore, the transmission rate 1/((L+M+15)/8) of transmitting information by the optical signal encoded in the first encoding method is larger than the transmission rate 1/((j+k)/2) of transmitting information by the optical signal encoded in the second encoding method.

The binary sequence corresponding to the authentication information is encoded into the optical signals which are alternately bright or dark, based on the first correspondence between a binary piece and a bright signal with a predetermined time duration and the second correspondence between a binary segment and a dark signal with a predetermined time duration. The first binary segment is represented by the bright signal. Each bright signal corresponds to a binary segment, and each dark signal also corresponds to a binary segment. Therefore, the number of the bright signals is greater than or equal to the number of the dark signals in the optical signal obtained by encoding. Because a shortest time duration of the bright signal generated by a terminal is far less than a shortest time duration of the dark signal, information transmission efficiency is high, in a process of transmitting the authentication information by the optical signal obtained in the above encoding method.

In step 2035, all determined optical signals are successively combined as an optical signal corresponding to the binary sequence.

The transmitting device may combine successively all determined optical signals as the optical signal corresponding to the binary sequence. In the above embodiment, for example, the optical signals determined by the transmitting device are "bright with L+11 ms, dark with M+13 ms, bright with L+7 ms, dark with M+10 ms and bright with L+10 ms".

It should be noted that, the value of n is larger, combination modes of a binary segments are greater, and the time duration for transmitting all binary segments is longer, because each of binary segments corresponds to a bright signal or dark signal with a certain time duration. Thus, information transmission efficiency may become low. Therefore, in an implementation, n is usually 2 or 4. When n is 4, the information transmission efficiency is highest based on experimental data, which is not limited in the embodiment.

In step 204, the transmitting device transmits the optical signals to a receiving device.

After generating the optical signal, the transmitting device may transmit the generated optical signal to the receiving device. In an implementation, the transmitting device may control a light source of the transmitting device to turn on or off, so as to transmit the optical signal to the receiving device.

For example, corresponding to the optical signals "bright with L+11 ms, dark with M+13 ms, bright with L+7 ms, dark with M+10 ms and bright with L+10 ms" generated by the transmitting device, the transmitting device can control the light source on the transmitting device to turn on and off as a "bright with L+11 ms, dark with M+13 ms, bright with L+7 ms, dark with M+10 ms and bright with L+10 ms".

In step 205, the receiving device receives the optical signals from the transmitting device, where the optical signals carry the authentication information of the transmitting device.

The receiving device can receive the optical signal from the transmitting device. When the transmitting device transmits the optical signal by the light source the receiving device can receive the optical signals transmitted by the light source of the transmitting device turning on and off.

In an implementation, in order for the receiving device to receive the optical signal transmitted by the transmitting device, the light source of the transmitting device may align with a light-sensitive receptor in the receiving device. In this way, when the light source of the transmitting device turns on and off, the receiving device may receive the optical signals transmitted by the transmitting device.

In step 206, the receiving device decodes the optical signals into a corresponding binary sequence based on the correspondence between a binary segment of n bits and a bright-or-dark signal with a predetermined time duration, where n is a power of two.

In an implementation, this step may include:

for a bright signal of the optical signal, a binary segment in n bits corresponding to the bright signal is determined according to a first correspondence, where the first correspondence includes a correspondence between a binary segment in n bits and a bright signal with a predetermined time duration;

for a dark signal of the optical signal, a binary segment in n bits corresponding to the dark signal is determined according to a second correspondence, where the second correspondence includes a correspondence between a binary segment in n bits and a dark signal with a predetermined time duration; and all of the determined binary segments successively combines as a binary number corresponding to the optical signals.

This step corresponds to the step 203. That is, when the transmitting device transmits the optical signals "bright with L+11 ms, dark with M+13 ms, bright with L+7 ms, dark with M+10 ms and bright with L+10 ms", the receiving device may obtain a binary number with content "1011 0101 0111 0010 1010".

In step 207, the receiving device converts the binary sequence into the authentication information.

In step 208, the receiving device performs an information authentication based on the authentication information.

After obtaining the authentication information, the receiving device may perform the information authentication based on the authentication information. In an aspect the receiving device may directly authenticate the authentication information, or send the authentication information to the other device and then the other device may authenticate the authentication information, which are not limited in the embodiment.

In a first application scenario of the embodiment, when virtual resource needs to be transferred, the user may obtain an identification of an electronic device by the electronic device, and the identification is used as authentication information. The electronic device generates an optical signal which carries the authentication information, and sends the optical signal to a device at an object providing side. The device at the object providing side receives the optical signal, then obtains the authentication information carried in the optical signal, and authenticates the identification of the authentication information. After the authentication is passed, the target number of resources to be transferred in a resource account corresponding to the identification is transferred into the user's account. The target number of resources to be transferred may be input by a person at the object providing side, or may be generated based on an order, which will not be limited in the embodiment.

In an aspect, after obtaining the authentication information carried in the optical signal, the device at the object providing side may send a transferring request to a transferring server, where the transferring request includes the authentication information and the target number of resources to be transferred. The transferring server authenticates the authentication information. After the authentication is passed, the target number of resources to be transferred in a resource account corresponding to the identification of the authentication information is transferred into the resource account corresponding to the object providing side.

It should be noted that the authentication information includes the identification of the user and identification information of a resource account bound with an electronic device, such that the device at the object providing side and the transferring server may effectively determine the resource account corresponding to the identification, which will not be limited in the embodiment. The identification information corresponds to the resource account, and is obtained when the electronic device activates a virtual resource transferring service. In addition, to prevent a hacker from stealing the identification and the identification information carried in the optical signal, the electronic device may generate a first signature on the identification and the identification information in a digital signature algorithm, and all of the identification, the identification information and the first signature is used as identification information, which will not be limited in the embodiment.

Furthermore, in the case that the device at the object providing side sends to the transferring server a transferring request including the authentication information and the target number of resources to be transferred and the transferring server performs the resource transferring, the device at the object providing side may generate a second signature on the identification information and the target number of resources to be transferred, to avoid the stealing of the identification information. Then, the transferring request, including the authentication information, the target number of resources to be transferred and the second signature, is sent to the transferring server, which will not be limited in the embodiment.

In a second application scenario of the embodiment, when a user needs to enter a meeting place, the user may obtain a number of an admission ticket by an electronic device, and the number of the admission ticket is used as authentication information. The electronic device may send an optical signal which carries the authentication information to an authentication device disposed at an entrance of the meeting place. The authentication device automatically authenticates the number of the admission ticket carried in the optical signal, and the ticket is checked in the case that the authentication is passed, thus improving the efficiency of a ticket inspection.

In a third application scenario of the embodiment, when a user needs to perform a attendance register, the user may obtain an identification of the user by an electronic device, and the identification is used as the authentication information. The electronic device may generate an optical signal which carries the authentication information, and send the optical signal to a register device. The register device receives the optical signal, authenticates the identification carried in the optical signal, and achieves the register process. In this way, the problems that a current fingerprint attendance machine cannot recognize a fingerprint, the user needs to touch a fingerprint collection region repeatedly and user's operations are complex are avoided, and thus achieving the effect of simplifying user's operation.

With the information transmission method according to the embodiment, the obtained authentication information is converted into a binary sequence; optical signals corresponding to the binary sequence are generated; then the generated optical signals are transmitted to a receiving device. After receiving the optical signal, the receiving device obtains the authentication information in the optical signal and performs an information authentication based on the authentication information. The technical solutions solve a problem that the transmitting device cannot transmit the authentication information to the receiving device and then cannot realize an information authentication in prior art, because the transmitting device cannot establish a network connection to the receiving device. In addition, the authentication information carried in the optical signal is transmitted. In this way, the technical solutions also solve a problem that the authentication information transmitted by the transmitting device is easily stolen by a hacker and then may be leaked in the existing technology. Thus, the following effects are achieved, in that the transmitting device can always transmit the optical signals which carry the authentication information to the receiving device and the authentication information in the optical signal is not easily leaked.

Since a minimum duration of a bright signal generated by the transmitting device is much less than that of a dark signal generated by the transmitting device, in a process of transmitting the same length of binary sequence, an optical signal obtained in the encoding mode according to the embodiment has a short transmission time, where the encoding mode according to the embodiment includes encoding binary segments of n bits of the binary sequence by the bright signals with different time durations. Thus, the information transmitting efficiency is improved.

It should be noted that, before the transmitting device obtains the authentication information, the receiving device or an information distribution device may assign to the transmitting device first information and second information associated with the first information. Accordingly, the transmitting device may receive the first information and the second information assigned by the information distribution device or the receiving device. In this case, the step of obtaining the authentication information by the transmitting device may include the following sub-steps S101 to S103.

In step S101, an identification of the transmitting device is obtained.

In step S102, a digital signature on the identification, the first information and the second information are generated in a digital signature algorithm.

In an implementation, since the transmitting device is usually an electronic device with a poor processing capacity, such as a mobile phone, a tablet computer or an e-reader, the transmitting device may generate the digital signature on the identification, the first information and the second information in MD5 (Message Digest Algorithm 5) algorithm, to reduce a processing complexity of the transmitting device, which will not be limited in the embodiment. Certainly, the transmitting device may also use SHA1 (Secure Hash Algorithm) with a higher security, which will also not be limited in the embodiment.

In addition, in order to improve the information security, the transmitting device may also generate a digital signature on the identification, the first information, the second information and a random number, which will not be limited in the embodiment.

In step S103, the identification, the first information and the digital signature are determined as the authentication information.

After generating the digital signature, the transmitting device may determine the identification, the first information and the digital signature as the authentication information. Certainly, the transmitting device may determine the identification, the first information, the second information and the digital signature as the authentication information, which will not be limited in the embodiment.

In the case that the transmitting device determines the identification, the first information and the digital signature as the authentication information, the step of performing the information authentication by the receiving device based on the authentication information includes the follows. In a case that the first information and the second information are information assigned by the receiving device, the receiving device may directly authenticates the authentication information. In a case that the first information and the second information are information assigned by the information distribution device, the receiving device may transmit the authentication information to the information distribution device, and the information distribution device authenticates the authentication information. The procedure of authenticating the authentication information by the receiving device is similar as the procedure of authenticating the authentication information by the information distribution device. In the embodiment, the procedure of authenticating the authentication information by the receiving device is described in detail herein, the procedure of authenticating the authentication information by the information distribution device may refer to the procedure of authenticating by the receiving device, which will not be limited in the embodiment.

The procedure of authenticating the authentication information by the receiving device includes steps S201 to S202.

In step S201, the second information associated with the first information is obtained in the authentication information.

In step S202, the digital signature is authenticated, based on the identification and the first information in the authentication information, and the obtained second information.

The receiving device may decrypt the digital signature in the authentication information to obtain a decrypted message digest; generate a message digest of the identification, the first information and the obtained second information; and detect whether the decrypted message digest matches the generated message digest. If the decrypted message digest matches the generated message digest, the authentication of the digital signature is passed; else, the authentication fails.

Based on the principle of the digital signature algorithm, only when the obtained second information is assigned by the receiving device and associated with the first information, the decrypted message digest matches the generated message digest. Therefore, by using the above information as the authentication information, even if the authentication information is intercepted by a hacker, the hacker can not obtain the second information associated with the first information and the digital signature can not pass the authentication, which enhances the security of information transmission.

It should be noted that, in order to inform a receiving end for authenticating the digital signature a signature mode of the digital signature, the transmitting device may also determine the signature mode of the digital signature as the authentication information, which will also not be limited in the embodiment.

In step S203, in a case that the authentication of the digital signature is passed, the identification is authenticated.

In the case that the authentication of the digital signature is passed, the receiving device may continue authenticating the identification. In an implementation, the receiving device may detect whether the identifier which is the same as the identification is saved. If the identifier which is the same as the identification is saved, the identification authentication succeeds, and if the identifier which is the same as the identification is not saved, the authentication fails.

In addition, in the case that the receiving device fails to authenticate the digital signature, the process ends, which is not described herein.

In the above embodiment, procedures implemented by a transmitting device can be individually implemented as an information transmission method on the transmitting device; and procedures implemented by a receiving device can be individually implemented as an information reception method on the receiving device.

Figure 3:
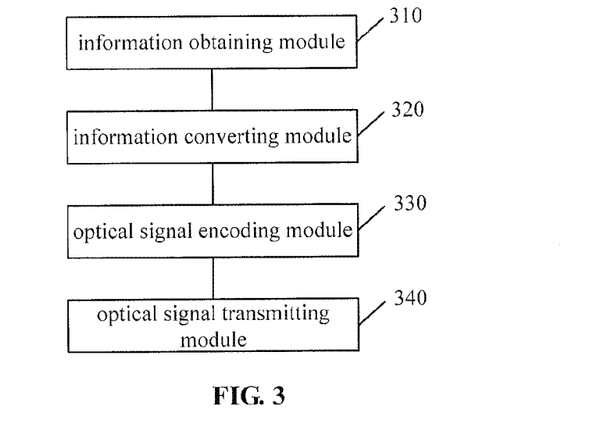
FIG. 3 is a block diagram of an information transmitting device according to an embodiment of the disclosure.

Reference is made to FIG. 3, which is a block diagram of an information transmitting device according to an embodiment of the disclosure. The information transmitting device may become all or part of the transmitting device by hardware, software, or a combination of both. The information transmitting device may include: an information obtaining module 310, an information converting module 320, an optical signal encoding module 330 and an optical signal transmitting module 340.

The information obtaining module 310 is configured to obtain authentication information.

The information converting module 320 is configured to convert the authentication information obtained by the information obtaining module 310 into a binary sequence.

The optical signal encoding module 330 is configured to encode the binary sequence converted by the information conversion module 320 into corresponding optical signals based on a correspondence between a binary number and an optical signal.

The optical signal transmitting module 340 is configured to transmit the optical signals encoded by the optical signal encoding module 330 to a receiving device, so that the receiving device receives the optical signals, obtain the authentication information in the optical signals, and performs an information authentication based on the authentication information.

Thus, the information transmitting device according to the embodiment generates the optical signals corresponding to the binary sequence, by converting the obtained authentication information into the binary sequence; and transmits the generated optical signals to the receiving device.

Upon receipt of the optical signal, the receiving device obtains the authentication information in the optical signals, and performs the information authentication based on the authentication information. The technical solutions solve a problem that the transmitting device cannot transmit the authentication information to the receiving device and an information authentication cannot be implemented in the existing technology, because the transmitting device cannot establish a network connection to the receiving device. In addition, the authentication information carried in the optical signal is transmitted. In this way, the technical solutions also solve a problem that the authentication information transmitted by the transmitting device is easily stolen by a hacker and then may be leaked in the existing technology. Thus, the following effects are achieved, in that the transmitting device can always transmit the optical signals which carry the authentication information to the receiving device and the authentication information in the optical signal is not easily leaked.

Figure 4:
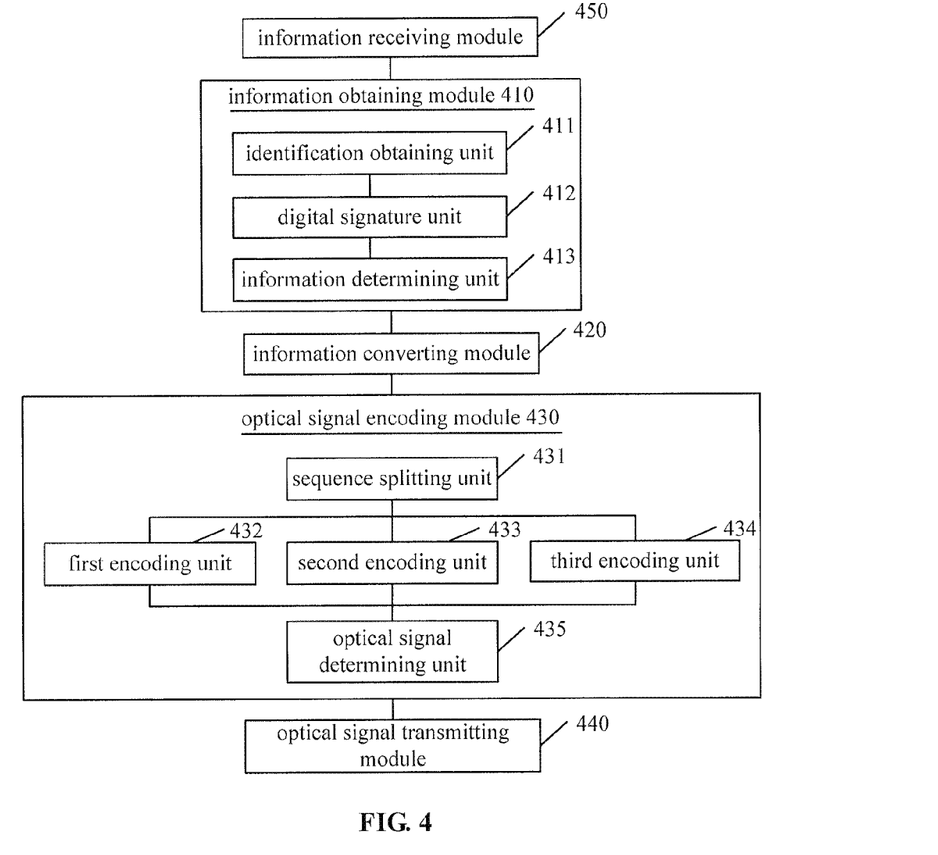
FIG. 4 is a block diagram of an information transmitting device according to another embodiment of the disclosure.

Reference is made to FIG. 4, which is a block diagram of an information transmitting device according to an embodiment of the disclosure. The information transmitting device may become all or part of the transmitting device by hardware, software, or a combination of both. The information transmitting device may include: an information obtaining module 410, an information converting module 420, an optical signal encoding module 430 and an optical signal transmitting module 440.

The information obtaining module 410 is configured to obtain authentication information.

The information converting module 420 is configured to convert the authentication information obtained by the information obtaining module 410 into a binary sequence.

The optical signal encoding module 430 is configured to encode the binary sequence converted by the information conversion module 420 into corresponding optical signals, based on a correspondence between a binary number and an optical signal.

The optical signal transmitting module 440 is configured to transmit the optical signals encoded by the optical signal encoding module 430 to a receiving device.

The receiving device receives the optical signal, obtains the authentication information in the optical signals, and performs an information authentication based on the authentication information.

In a first possible implementation of the embodiment, the optical signal encoding module 430 is configured to encode the binary sequence into the corresponding optical signal, based on a correspondence between a binary segment in n bits and a bright-or-dark signal with a predetermined time duration, where n is a power of two.

In a second possible implementation of the embodiment, the optical signal encoding module 430 includes a sequence splitting unit 431, a first encoding unit 432, a second encoding unit 433, a third encoding unit 434 and an optical signal determining unit 435.

The sequence splitting unit 431 is configured to split a binary sequence into binary segments of n bits.

The first encoding unit 432 is configured to, for the i-th binary segment split by the sequence splitting unit 431, when i=1, determine a bright signal corresponding to the first binary segment based on a first correspondence, where i is a positive integer. The first correspondence is a correspondence between a binary segment of n bits and a bright signal with a predetermined time duration.

The second encoding unit 433 is configured to, when i is larger than 1 and the (i−1)-th binary segment corresponds to a bright signal, determine the dark signal corresponding to the i-th binary segment based on a second correspondence. The second correspondence includes a correspondence between a binary segment in n bits and a dark signal with a predetermined time duration.

The third encoding unit 434 is configured to, when i is larger than 1 and the (i−1)-th binary segment corresponds to a dark signal, determine the bright signal corresponding to the i-th binary segment based on the first correspondence.

The optical signal determining unit 435 is configured to successively combine all determined optical signals as the optical signal corresponding to the binary sequence.

In a third possible implementation of the embodiment, the optical signal transmitting module 440 is configured to control a light source of the transmitting device to turn on and off, so as to transmit the optical signal to the receiving device.

In a fourth possible implementation of the embodiment, the device further includes:

an information receiving module 450 configured to receive first information and second information associated with the first information, where the first information and the second information are assigned to the transmitting device by the receiving device or an information distribution device.

The information obtaining module 410 may includes an identification obtaining unit 411, a digital signature unit 412 and an information determining unit 413.

The identification obtaining unit 411 is configured to obtain an identification of the transmitting device.

The digital signature unit 412 is configured to generate a digital signature on the identification, first information and second information in a digital signature algorithm.

The information determining unit 413 is configured to determine the identification, the first information and the digital signature as the authentication information.

The information transmitting device according to the embodiment converts the obtained authentication information into the binary sequence, generates the optical signals corresponding to the binary sequence and then transmits the generated optical signals to the receiving device.

Upon receipt of the optical signals, the receiving device obtains the authentication information carried in the optical signals, and performs the information authentication based on the authentication information. The technical solutions solve a problem that the transmitting device cannot transmit the authentication information to the receiving device and an information authentication cannot be implemented in the existing technology, because the transmitting device cannot establish a network connection to the receiving device. In addition, the authentication information carried in the optical signal is transmitted. In this way, the technical solutions also solve a problem that the authentication information transmitted by the transmitting device is easily stolen by a hacker and then may be leaked in the existing technology. Thus, the following effects are achieved, in that the transmitting device can always transmit the optical signals which carry the authentication information to the receiving device and the authentication information in the optical signal is not easily leaked.

Since a minimum duration of a bright signal generated by the transmitting device is much less than that of a dark signal generated by the transmitting device, in a process of transmitting the same length of binary sequence, an optical signal obtained in the encoding mode according to the embodiment has a short transmission time, where the encoding mode according to the embodiment includes encoding binary segments of n bits of the binary sequence by the bright signals with different time durations. Thus, the information transmitting efficiency is improved.

Figure 5:
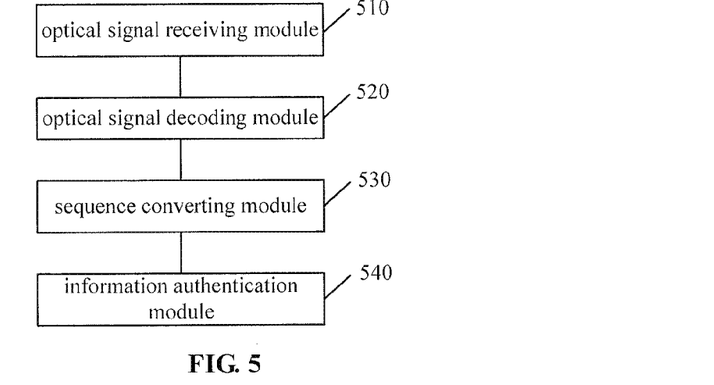
FIG. 5 is a block diagram of an information transmitting device according to another embodiment of the disclosure.

Reference is made to FIG. 5, which is a structure block diagram of an information receiving device according to an embodiment of the disclosure. The information receiving device may become all or part of the transmitting device by hardware, software, or a combination of both. The information receiving device may include: an optical signal receiving module 510, an optical signal decoding module 520, a sequence converting module 530 and an information authentication module 540.

The optical signal receiving module 510 is configured to receive optical signals from a transmitting device, where the optical signal carries authentication information of the transmitting device.

The optical signal decoding module 520 is configured to decode optical signals received by the optical signal receiving module 510 into a binary sequence, based on a correspondence between a binary number and an optical signal.

The sequence converting module 530 is configured to convert the binary sequence decoded by the optical signal decoding module 520 into the authentication information.

The information authentication module 540 is configured to perform an information authentication based on the authentication information converted by a sequence converting module 530.

The information transmitting device according to the embodiment receives the optical signals carrying the authentication information from the transmitting device; obtains the authentication information in the optical signal; and performs the information authentication based on the authentication information. The technical solutions solve a problem that the transmitting device cannot transmit the authentication information to the receiving device and the information authentication cannot be implemented in the existing technology, because the transmitting device cannot establish a network connection to the receiving device. In addition, the authentication information carried in the optical signal is transmitted. In this way, the technical solutions also solve a problem that the authentication information transmitted by the transmitting device is easily stolen by a hacker and then may be leaked in the existing technology. Thus, the following effects are achieved, in that the transmitting device can always transmit the optical signal which carries the authentication information to the receiving device and the authentication information in the optical signal is not easily leaked.

Figure 6:
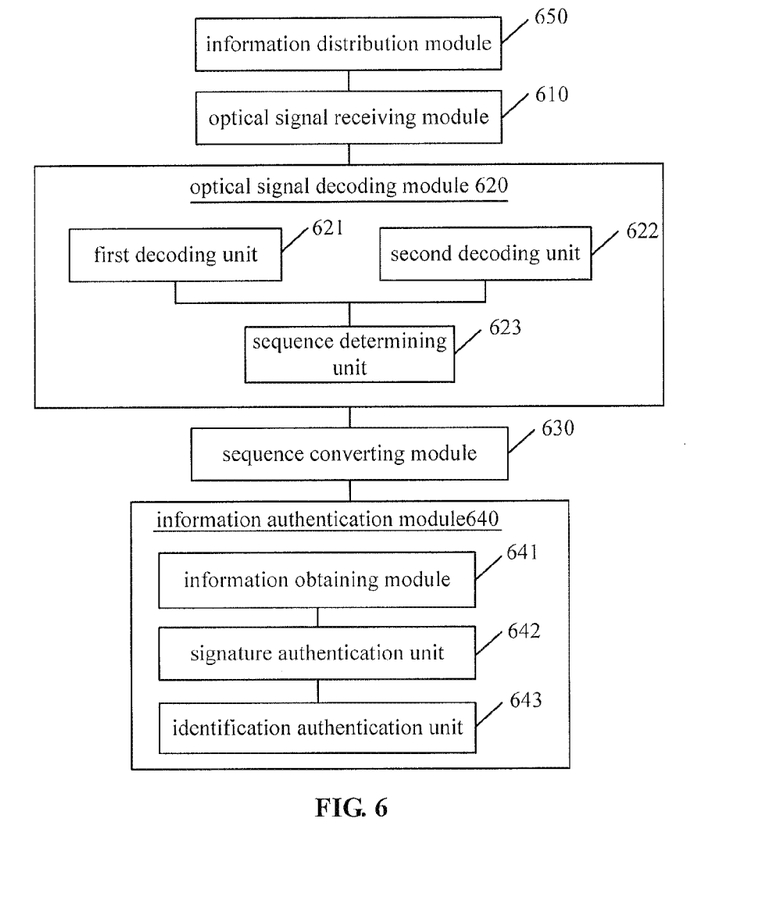
FIG. 6 is a block diagram of an information transmitting device according to another embodiment of the disclosure.

Reference is made to FIG. 6, which is a block diagram of an information receiving device according to another embodiment of the disclosure. The information receiving device may become all or part of the transmitting device by hardware, software, or a combination of both. The information receiving device may include: an optical signal receiving module 610, an optical signal decoding module 620, a sequence converting module 630 and an information authentication module 640.

The optical signal receiving module 610 is configured to receive an optical signal from a transmitting device, where the optical signal carries authentication information of the transmitting device.

The optical signal decoding module 620 is configured to decode the optical signal received by the optical signal receiving module 610 into a corresponding binary sequence based on a correspondence between a binary number and an optical signal.

The sequence converting module 630 is configured to convert the binary sequence decoded by the optical signal decoding module 620 into the authentication information.

The information authentication module 640 is configured to perform an information authentication based on the authentication information converted by the sequence converting module 630.

In a first possible implementation of the embodiment, the optical signal decoding module 620 is configured to decode the optical signal into the corresponding binary sequence, based on a correspondence between a binary segment of n bits and a bright-or-dark signal with a predetermined time duration, where n is a power of two.

In a second possible implementation of the embodiment, the optical signal decoding module 620 includes a first decoding unit 621, a second decoding unit 622 and a sequence determining unit 623.

The first decoding unit 621 is configured to, for a bright signal in the optical signals, a binary segment in n bits corresponding to the bright signal is determined according to a first correspondence, where the first correspondence includes a correspondence between a binary segment in n bits and a bright signal with a predetermined time duration.

The second decoding unit 622 is configured to that, for a dark signal in the optical signals, a binary segment in n bits corresponding to the dark signal is determined according to a second correspondence, where the second correspondence includes a correspondence between a binary segment of n bits and a dark signal with a predetermined time duration.

The sequence determining unit 623 is configured to successively combine all of the determined binary segments as a binary sequence corresponding to the optical signal.

In a third possible implementation of the embodiment, the optical signal receiving module 610 is configured to receive the optical signals emitted by on and off periods of a light source of the transmitting device.

In a fourth possible implementation of the embodiment, the device further includes:

an information distribution module 650 configured to assign to the transmitting device first information and second information associated with the first information, obtain the identification by the transmitting device, generate a digital signature on the identification, the first information and the second information in a digital signature algorithm, and determine the identification, the first information and the digital signature as the authentication information.

The information authentication module 640 includes an information obtaining unit 641, a signature authentication unit 642 and an identification authentication unit 643.

The information obtaining unit 641 is configured to obtain the second information associated with the first information in the authentication information.

The signature authentication unit 642 is configured to authenticate the digital signature, based on the identification and the first information in the authentication information, and the obtained second information.

The identification authentication unit 643 is configured to authenticate the identification, in a case that the signature authentication unit 642 passes through an authentication for the digital signature.

The information transmitting device according to the embodiment receives the optical signals carrying the authentication information from the transmitting device, obtains the authentication information in the optical signals; and performs the information authentication based on the authentication information. The technical solutions solve a problem that the transmitting device cannot transmit the authentication information to the receiving device and an information authentication cannot be implemented in the existing technology, because the transmitting device cannot establish a network connection to the receiving device. In addition, the authentication information carried in the optical signal is transmitted. In this way, the technical solutions also solve a problem that the authentication information transmitted by the transmitting device is easily stolen by a hacker and then may be leaked in the existing technology. Thus, the following effects are achieved, in that the transmitting device can always transmit the optical signals which carry the authentication information to the receiving device and the authentication information in the optical signal is not easily leaked.

Since a minimum duration of a bright signal generated by the transmitting device is much less than that of a dark signal generated by the transmitting device, in a process of transmitting the same length of binary sequence, an optical signal obtained in the encoding mode according to the embodiment has a short transmission time, where the encoding mode according to the embodiment includes encoding binary segments of n bits of the binary sequence by the bright signals with different time durations. Thus, the information transmitting efficiency is improved.

It should be noted that, an information transmitting system may include a transmitting device and a receiving device. The transmitting device includes an information transmitting device as shown in FIG. 3 or FIG. 4; and the receiving device may include an information receiving device as shown in FIG. 5 or FIG. 6. The technical details refer to the corresponding embodiment, which will not be described herein.

It should be noted that, in the processes of transmitting information by the information transmitting device and receiving information by the information receiving device, a division of each above-described function module is only taken for an example. In practical application, the above-described functions can be divided into different function modules to implement each function as required, namely, the internal structure of the device is divided into different function modules so as to complete the all or part of functions described above. In addition, the information transmitting device according to the above embodiments and method embodiments of the information transmitting method belong to a same concept, the information receiving device according to the above embodiments and method embodiments of the information receiving method also belong to a same concept, and their specific implementation process refers to the method embodiments, which is not described herein.

It may be understood by those skilled in the art, all or part of steps implementing the above-described embodiments may be completed by hardware, may also be completed by the hardware instructed by relevant program instructions, which can be stored in a non-volatile computer readable storage medium. The above-mentioned storage medium may be a read-only memory, a disk, a CD or the like.

The embodiments are not meant to limit the disclosure. All modifications, equivalent variations and improvements made without departing from the spirit and principle of the disclosure shall fall in the scope of the claims.

The invention claimed is:

1. An information transmitting method, comprising:
    obtaining authentication information by a transmitting device;
    converting, by the transmitting device, the authentication information into a binary sequence;
    segmenting, by the transmitting device, the binary sequence into a sequence of equal-length n-bit binary segments, each n-bit binary segment having a value corresponding to a binary representation thereof, where n is greater than or equal to 2;
    in response to the segmenting, determining, by the transmitting device, a first predetermined time duration and a second predetermined time duration for each n-bit binary segment value, wherein a first predetermined time duration is selected when the an n-bit binary segment value is transmitted as a bright optical signal, and a second predetermined time duration is selected for a same n-bit binary segment value when transmitted as a dark optical signal, wherein the first predetermined time duration corresponding to each n-bit binary segment value is selected from a set having a minimum time duration L, and the second predetermined time duration corresponding to each n-bit binary segment value is selected from a set having the minimum time duration M; wherein M is greater than L and a first predetermined time duration and a second predetermined time duration for each successive n-bit binary segment value are greater than a first predetermined time duration and second predetermined time duration, of an immediately previous n-bit binary segment value;

generating, by the transmitting device bright optical signals and dark optical signals for the sequence of equal-length n-bit binary segments, wherein a total number of the bright optical signals is greater than or equal to a total number of the dark optical signals; and transmitting, by the transmitting device to a receiving device, the binary sequence using the bright optical signals and dark optical signals generated, wherein the bright optical signals and dark optical signals are transmitted in an alternate manner.

2. The method according to claim 1, wherein the transmitting the bright optical signals and dark optical signals to the receiving device comprising:

controlling a flashlight light source of the transmitting device to turn on and off, to transmit the bright optical signal and dark optical signals to the receiving device.

3. The method according to claim 1, wherein before the obtaining the authentication information, the method comprises:

receiving first information and second information, wherein the second information is associated with the first information, wherein the first information and the second information are assigned to the transmitting device by the receiving device or an information distribution device, and the obtaining the authentication information comprises:
obtaining an identification of the transmitting device;
generating a digital signature based on the identification, the first information and the second information in a digital signature algorithm; and
determining the identification, the first information and the digital signature as the authentication information.

4. An information receiving method, comprising:
receiving optical signals containing authentication information from a transmitting device, wherein the transmitting device has:
converted the authentication information into a binary sequence;
segmented the binary sequence into a sequence of equal-length n-bit binary segments, each n-bit binary segment having a value corresponding to a binary representation thereof, where n is greater than or equal to 2;
determined a first predetermined time duration and a second predetermined time duration for each n-bit binary segment value, wherein a first predetermined time duration is selected when an n-bit binary segment value is transmitted as a bright optical signal, and a second predetermined time duration is selected for a same n-bit binary segment value when transmitted as a dark optical signal, wherein the first predetermined time duration corresponding to each n-bit binary segment value is selected from a set having a minimum time duration L, and the second predetermined time duration corresponding to each n-bit binary segment value is selected from a set having the minimum time duration M; wherein M is greater than L and a first predetermined time duration and a second predetermined time duration for each successive n-bit binary segment value are greater than a first predetermined time duration and second predetermined time duration, of an immediately previous n-bit binary segment value;

generated bright optical signals and dark optical signals for the sequence of equal-length n-bit binary segments, wherein a total number of the bright optical signals is greater than or equal to a total number of the dark optical signals; and transmitted the binary sequence using the bright optical signals and dark optical signals generated, and the bright optical signals and dark optical signals are transmitted in an alternate manner;

decoding the received optical signals into a sequence of n-bit binary segment values based on a correspondence between a binary number and an optical signal of predetermined time duration;

converting the sequence of n-bit binary segment values into the authentication information; and performing an information authentication based on the authentication information.

5. The method according to claim 4, wherein the decoding the received optical signals comprises:

decoding the optical signals into the sequence of n-bit binary segment values based on a correspondence between each n-bit binary segment value and a bright-or-dark signal with a corresponding predetermined time duration, wherein n is a power of two.

6. The method according to claim 5, wherein the decoding the optical signals into the sequence of n-bit binary segment values based on a correspondence between each n-bit binary segment value and bright or dark signal with the corresponding predetermined time duration, wherein n is a power of two comprises:

for a bright signal in the optical signals, determining an n-bit binary segment value corresponding to a bright signal according to a first correspondence, wherein the first correspondence comprises a correspondence between an n-bit binary segment and a bright signal with a corresponding predetermined time duration;

for a dark signal in the optical signals, determining an n-bit binary segment value corresponding to a dark signal according to a second correspondence, wherein the second correspondence comprises a correspondence between an n-bit binary segment and a dark signal with a predetermined time duration; and combining successively all of the determined binary segment values as a binary sequence corresponding to the optical signals received.

7. The method according to claim 4, wherein the receiving optical signals from a transmitting device comprising:

receiving the optical signals emitted by a flashlight light source of the transmitting device.

8. The method according to claim 4, wherein before the receiving the optical signals from the transmitting device, the method comprises:

assigning to the transmitting device first information and second information, the second information is associated with the first information; and the performing an information authentication based on the authentication information comprising:

obtaining the second information which is associated with the first information in the authentication information, wherein the authentication information comprises an identification of the transmitting device, the first information and a digital signature; the digital signature is a digital signature based on the identification, the first information and the second information; and the digital signature is generated in a digital signature algorithm by the transmitting device;

authenticating the digital signature, based on the identification and the first information in the authentication information, and the obtained second information; and authenticating the identification, in a case that authentication of the digital signature passes.

9. A communications system, comprising:
one or more processors configured to execute program instructions stored in a non-transitory computer-readable storage medium and cause one or more processors of a transmitting device to:
obtain authentication information;
convert the authentication information into a binary sequence;
segment the binary sequence into a sequence of equal-length n-bit binary segments, each n-bit binary segment having a value corresponding to a binary representation thereof, where n is greater than or equal to 2;
determine a first predetermined time duration and a second predetermined time duration for each n-bit binary segment value, wherein a first predetermined time duration is selected when the an n-bit binary segment value is transmitted as a bright optical signal, and a second predetermined time duration is selected for a same n-bit binary segment value when transmitted as a dark optical signal, wherein the first predetermined time duration corresponding to each n-bit binary segment value is selected from a set having a minimum time duration L, and the second predetermined time duration corresponding to each n-bit binary segment value is selected from a set having the minimum time duration M; wherein M is greater than L and a first predetermined time duration and a second predetermined time duration for each successive n-bit binary segment value are greater than a first predetermined time duration and second predetermined time duration, of an immediately previous n-bit binary segment value;
control a flashlight light source to generate bright optical signals and dark optical signals for the sequence of n-bit binary segments, wherein a total number of the bright optical signals is greater than or equal to a total number of the dark optical signals; and
transmit the sequence using the bright optical signals and dark optical signals, wherein the bright optical signals and dark optical signals are transmitted in an alternate manner.

10. The communications system according to claim 9, wherein the one or more processors execute program instructions to cause the one or more processors of the transmitting device to:
control a flashlight light source of the transmitting device to turn on and off, to transmit the optical signals to a receiving device.

11. The communications system according to claim 9, wherein the one or more processors executes program instructions to cause the one or more processors of the transmitting device to:
receive first information and second information, wherein the second information is associated with the first information, wherein the first information and the second information are assigned to the transmitting device by the receiving device or an information distribution device;
obtain an identification of the transmitting device;
generate a digital signature based on the identification, the first information and the second information in a digital signature algorithm; and determine the identification, the first information and the digital signature as the authentication information.

12. A communications system, comprising:
one or more processors configured to execute program instructions stored in a non-transitory computer-readable storage medium and cause one or more processors of a transmitting receiving device to:
receive optical signals from a transmitting device, wherein, the transmitting device has:
converted authentication information into a binary sequence;
segmented the binary sequence into a sequence of equal-length n-bit binary segments, each n-bit binary segment having a value corresponding to a binary representation thereof, where n is greater than or equal to 2;
determined a first predetermined time duration and a second predetermined time duration for each n-bit binary segment value, wherein a first predetermined time duration is selected when the an n-bit binary segment value is transmitted as a bright optical signal, and a second predetermined time duration is selected for a same n-bit binary segment value when transmitted as a dark optical signal, wherein the first predetermined time duration corresponding to each n-bit binary segment value is selected from a set having a minimum time duration L, and the second predetermined time duration corresponding to each n-bit binary segment value is selected from a set having the minimum time duration M; wherein M is greater than L and a first predetermined time duration and a second predetermined time duration for each successive n-bit binary segment value are greater than a first predetermined time duration and second predetermined time duration, of an immediately previous n-bit binary segment value; generated bright optical signals and dark optical signals for the sequence of equal-length n-bit binary segments, wherein a total number of the bright optical signals is greater than or equal to a total number of the dark optical signals; and
transmitted the binary sequence using the bright optical signals and dark optical signals generated, wherein the bright optical signals and dark optical signals are transmitted in an alternate manner;
decode the received optical signals into a binary sequence based on a correspondence between a n-bit binary number and an optical signal duration;
convert the binary sequence into the authentication information; and
perform an information authentication based on the authentication information.

13. The communications system according to claim 12, wherein the one or more processors execute program instructions to cause the one or more processors of the transmitting receiving device to:
decode the optical signals into the binary sequence based on a correspondence between a binary segment of n bits and a bright-or-dark signal with a predetermined time duration, wherein n is a power of two.

14. The communications system according to claim 13, wherein the one or more processors execute processor executes program instructions to cause the one or more processors of the transmitting receiving device to:
for a bright signal in the optical signals, determining an n-bit binary segment value corresponding to a bright signal according to a first correspondence, wherein the first correspondence comprises a correspondence between an n-bit binary segment and a bright signal with a corresponding predetermined time duration;

for a dark signal in the optical signals, determining an n-bit binary segment value corresponding to a dark signal according to a second correspondence, wherein the second correspondence comprises a correspondence between an n-bit binary segment and a dark signal with a predetermined time duration; and combining successively all of the determined binary segment values as a binary sequence corresponding to the optical signals received.

15. The communications system according to claim 12, wherein the one or more processors executes processor executes program instructions to cause the one or more processors of the transmitting receiving device to:

receive the optical signals emitted by a flashlight light source of the transmitting device.

16. The communications system according to claim 12, wherein the one or more processors execute processor executes program instructions to cause the one or more processors of the transmitting device to:

assign to the transmitting device first information and second information, wherein the second information is associated with the first information;

obtain the second information which is associated with the first information in the authentication information, wherein the authentication information comprises an identification of the transmitting device, the first information and a digital signature; the digital signature is a digital signature based on the identification, the first information and the second information; and the digital signature is generated in a digital signature algorithm by the transmitting device;

authenticate the digital signature, based on the identification and the first information in the authentication information, and the obtained second information; and authenticate the identification, in a case that authentication of the digital signature passes.

\* \* \* \* \*